United States Patent [19]

Nyquist

[11] Patent Number: 4,973,110
[45] Date of Patent: Nov. 27, 1990

[54] STRUCTURAL FRAME ASSEMBLY

[76] Inventor: Lawrence M. Nyquist, 3018 N. Spaulding Ave., Chicago, Ill. 60618

[21] Appl. No.: 243,451

[22] Filed: Sep. 12, 1988

[51] Int. Cl.$^5$ .............................................. A47B 47/00
[52] U.S. Cl. ............................... 312/265.3; 312/265.2; 108/111; 403/252; 403/316
[58] Field of Search .............. 312/257.1, 265.1, 265.2, 312/265.3, 265.4, 265.5, 265.6, 195; 108/111, 156, 157; 403/240, 242, 252, 315, 316; 211/192

[56] References Cited

U.S. PATENT DOCUMENTS

| | | | |
|---|---|---|---|
| 3,178,245 | 4/1965 | Morioka et al. | 312/265.3 |
| 3,371,977 | 3/1968 | McCabe | 312/257.1 |
| 3,601,432 | 8/1971 | Fenwick et al. | 403/252 |
| 3,867,047 | 2/1975 | Wightman et al. | 403/242 |
| 3,932,047 | 1/1976 | Crossan | 108/156 |
| 3,976,014 | 8/1976 | Brown | 108/111 |
| 4,002,383 | 1/1977 | Holloway, Jr. | 312/228 |
| 4,050,752 | 9/1977 | Dykstra | 312/195 |
| 4,135,837 | 1/1979 | Suttles | 108/111 |
| 4,157,228 | 6/1979 | Hammerschlag | 211/192 |
| 4,173,934 | 11/1979 | Searby | 108/111 |
| 4,235,493 | 11/1980 | Bridges et al. | 312/265.3 |
| 4,285,436 | 8/1981 | Konstant et al. | 211/192 |

FOREIGN PATENT DOCUMENTS

| | | | |
|---|---|---|---|
| 136174 | 7/1947 | Australia | 312/257 SK |
| 1199451 | 8/1965 | Fed. Rep. of Germany | 108/111 |

Primary Examiner—Kenneth J. Dorner
Assistant Examiner—Brian K. Green
Attorney, Agent, or Firm—Willian Brinks Olds Hofer Gilson & Lione

[57] ABSTRACT

A structure and method for building a continuous structural frame and cabinet of variable length is provided comprising a plurality of U-shaped structures, a plurality of interconnecting members, and a wall. The plurality of structures are connected together in vertical position by the plurality of horizontal interconnecting members and the wall. In assembly of the invention, the wall may be inserted into the open channel formed by the U-shaped structures, whereupon pairs of guiding slots formed in the periphery of the wall engage the structures, and moved downwardly rigidly interconnecting the wall with the structures. A counter surface, vertical panels, drawers, hinged doors and the like may be affixed to the structural frame to define a counter base usable in a home kitchen, garage, laboratory, office, shop or the like.

18 Claims, 3 Drawing Sheets

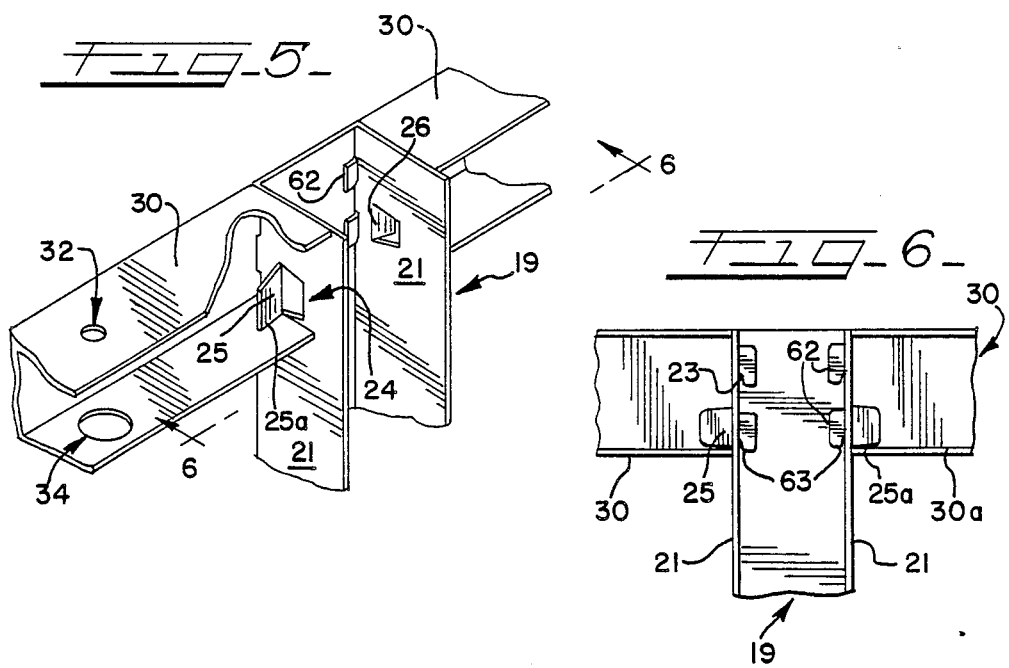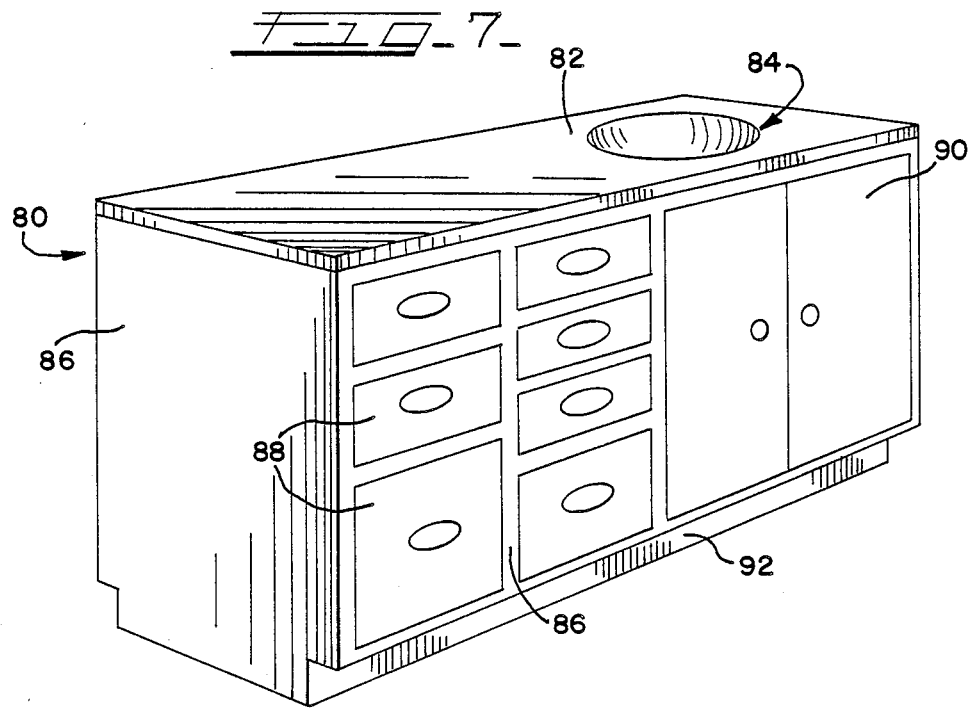

STRUCTURAL FRAME ASSEMBLY

TECHNICAL FIELD

This invention relates to structural frames for cabinets, and, more particularly, to a simple and inexpensive apparatus and method which permits the quick construction of a modular frame to provide a support for doors, drawers, cabinetwork, counter surfaces and the like.

BACKGROUND ART

The constructing of cabinetwork and counter bases for a home kitchen or the like is a laborious and expensive task. Conventional cabinetwork and cupboardlike cases are presently either constructed by skilled carpenters who are trained in the making of wooden cabinets or are assembled from prebuilt, factory made cabinet portions Cabinets must be constructed or fitted particularly for the physical dimensions of the building structure involved.

Prebuilt cabinet portions are conventionally constructed as individual wooden units having solid partitions separating one unit from an adjacent unit and providing a segmented face at the front side thereof. The presence of the partitions limits the storage area available within the units. The partitions can also dictate the placement of hardware and appliances within or atop the counter surface. For example, a kitchen sink may only be placed within the counter surface as allowed by the location of the partition obstacles extending between the rear and the front sides of the cabinetwork. To provide flexibility in fitting prebuilt cabinets to a building structure, the prebuilt cabinets are made with variably sized portions.

When a cabinetwork or counter base frame is to be custom made, a skilled carpenter must measure the dimensions of the desired site for the cabinetwork, design a cabinetwork to correspond with the physical dimensions of the site, and construct the cabinetwork by measuring and cutting the wooden pieces and building the pieces into a support frame for the cabinetwork while assuring that the cabinetwork is level at the site, regardless of whether the surface upon which the cabinetwork will rest is level.

DISCLOSURE OF THE INVENTION

The apparatus and method provided by this invention allows a user to quickly and inexpensively construct a continuous structural frame and provide a cabinet of variable length with a minimum number of parts and only moderate skill. Such a frame may be utilized in a home kitchen, garage, laboratory, office, shop or the like.

This invention provides a means for building cabinet enclosures of variable length comprising a plurality of structures, a plurality of interconnecting members, and a wall. Each structure comprises a pair of parallel channels and at least one cross member interconnecting the pair of channels to maintain their spacing. The channels of the plurality of structures and the interconnecting members are adapted to be interconnected by engagement of the ends of the interconnecting members with the channels. The wall provides surfaces engaging and interconnecting the channels of the plurality of structures whereby the plurality of structures may be supported vertically and form a cabinet network of variable length.

In a preferred embodiment, the channels of the plurality of structures each include a slot and the ends of the interconnecting members each include a slot-engaging surface. The slots are formed as openings in the channels and the slot-engaging surfaces of the interconnecting members are slidable coupling means such as hook-like extensions of the interconnecting members. In addition, the channels of the structures may be cut to provide a portion that may be bent into engagement with the interconnecting members when their hook-like extensions engage the slots of the channels.

Furthermore, the channels of the plurality of structures preferably have a face and two side flanges defining a U-shaped cross-section, and the wall has a plurality of slots in its periphery arranged in a plurality of pairs to permit the side flanges of the U-shaped channels to be fitted therein. The pairs of slots are spaced along the periphery of the wall at intervals of distance equal to the length of the interconnecting members.

The method provided by a presently preferred embodiment of the invention comprises the steps of connecting the plurality of interconnecting members to the plurality of structures to create a structural frame of desired length having an open center, inserting the wall tilted about its longitudinal axis through the open center formed by the plurality of structures, positioning the wall so that the plurality of surface portions at its periphery edge may engage the channels of the plurality of structures, rotating the wall about its longitudinal axis until the plurality of surface portions engage the channels of the plurality of structures and the wall is substantially perpendicular to the plurality of structures, and moving the wall downwardly until it is adjacent the ends of the plurality of structures.

Thus, in a preferred assembled structural frame of this invention, each of the plurality of structures have an opened end, two channel-shaped vertical members, and a closed end defined by a horizontal base cross member connecting the vertical members together. Each of the plurality of structures is rigidly interconnected near its opened end to the adjacent structure or structures by the interconnecting members extending from its channel-shaped vertical members to the channel-shaped vertical members of the adjacent structure or structures. The wall provides surfaces engaging and interconnecting the vertical members of the structures adjacent the horizontal base members.

Each vertical member of the plurality of structures comprises a face and two side flanges and at least one slot opening positioned in each of the two side flanges. As noted above, each of the interconnecting members has a slidable coupling means adapted to engage the vertical members of the structures for coupling the interconnecting members with the vertical members. The slidable coupling means comprises hook-like members extending from the interconnecting members which are inserted into the slot openings in the vertical members and moved downwardly into engagement with the vertical members. The hook-like members have an inclined interior gripping surface which engages the vertical member, thereby rigidly coupling the interconnecting member to the vertical member. Each vertical member also includes a bendable ear formed in the side flange of the vertical member with an inclined horizontal edge which is bendable from a first position where the ear is flush with the side flanges of the vertical member to a second position where the inclined horizontal edge of the ear extends outwardly from the side flange of the vertical member to engage the interconnecting member.

Each structure may further include a central member positioned parallel to the horizontal base member being connected at its ends to the vertical members. The provision of two cross members, that is the horizontal base member and the central cross member, lends greater rigidity to the vertical structures.

The structural frame provided by the preferred embodiment of this invention includes a leveling means comprising at least two threaded bores formed in the horizontal base members of the plurality of structures and a plurality of support legs threadable into the threaded bores. The support legs are adjustable and the structural frame may be leveled by the extent to which the support legs are threaded into the bores.

The structural frame provided by a presently preferred embodiment of this invention may be used to support a horizontal counter surface fastened atop the frame and vertical panels fastened to the frame. In addition, a sink may be positioned in the counter surface; a plurality of drawers may be supported within the frame; and, hinged doors may be affixed to the frame to define a home kitchen counter and cabinetwork.

BRIEF DESCRIPTION OF THE DRAWINGS

FIG. 5 is a perspective view showing the interconnection of the vertical structures and interconnecting members of the invention;

FIG. 6 is a front view of the coupling junction of FIG. 5; and

FIG. 7 is a perspective view of a completed counter base resulting from the apparatus and method of the invention.

BEST MODE FOR CARRYING OUT THE INVENTION

Figure 1:
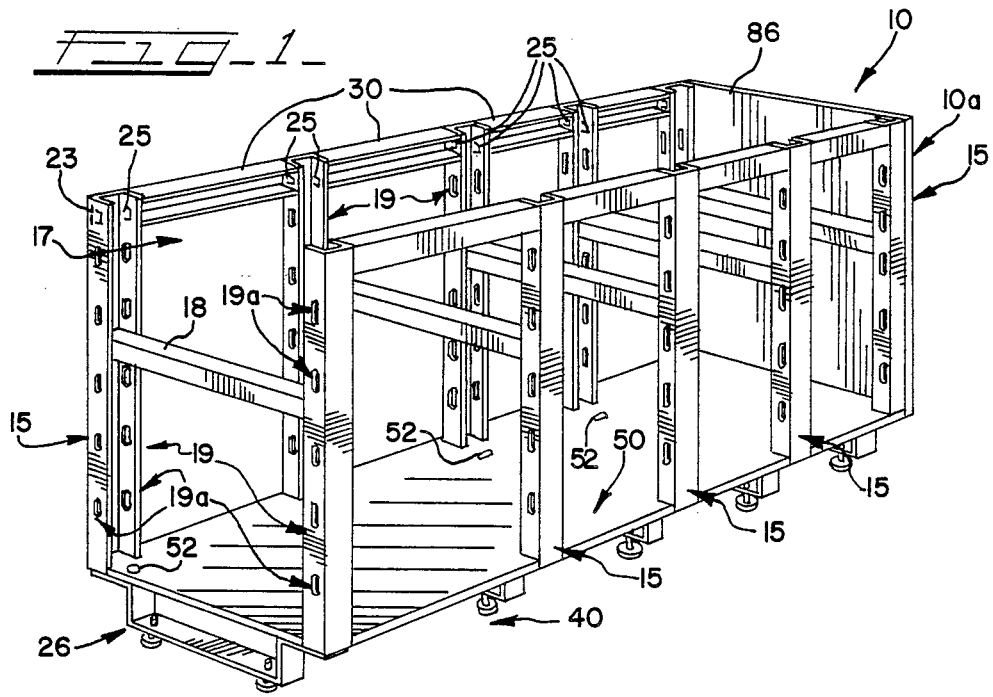
FIG. 1 is a perspective view of a structural frame of the invention resulting from the assembly of the means for building cabinets of this invention.
Figure 2:
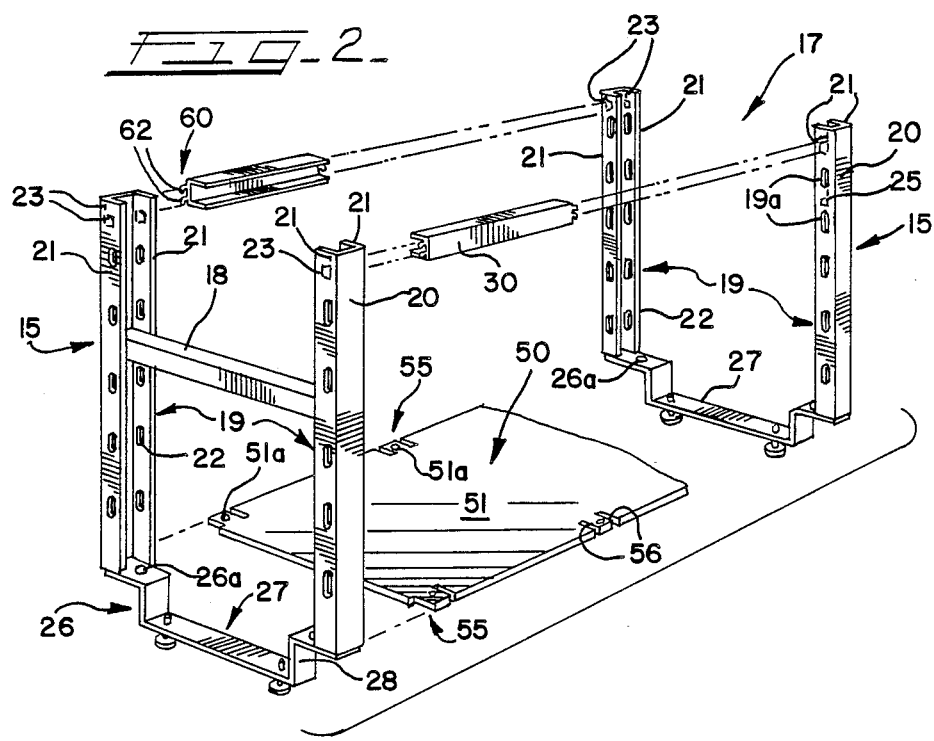
FIG. 2 a perspective partial view of the individual disassembled means for building the structural frame of FIG. 1 of the invention indicating their use to construct the structural frame of FIG. 1.

In FIGS. 1 and 2, a structural frame 10 is shown comprising a plurality of adjacent U-shaped structures 15, a plurality of horizontal interconnecting members 30, and a bottom wall 50. Each U-shaped structure 15 has an opened, upper end 17, two channel-shaped vertical members 19, and a closed end defined by horizontal base member 26 connecting the vertical members together at their lower ends and extending therebetween. Positioning horizontal base member 26 so that it connects the vertical members together at their lower ends permits the "squaring up" of the structural frame without requiring the use of rear support panels or diagonal support members. U-shaped structures 15 are rigidly interconnected near opened end 17 to the adjacent U-shaped structures 15 by horizontal interconnecting members 30 which extend from a channel-shaped vertical members 19 to the channel-shaped vertical members 19 of adjacent U-shaped structure 15. Each U-shaped structure 15 is positioned so that horizontal base members 26 form a base for structural frame 10. Wall 50 is preferably adapted to provide surfaces 55 which engage and interconnect vertical members 19 of U-shaped structures 15 adjacent horizontal base members 26, and to be affixed to the base members by fasteners 52.

Each vertical member 19 is preferably provided with a plurality of apertures 19a in which drawer support structures (not shown) may be affixed. The plurality of apertures formed in each vertical member 19 permits the user to select a variable drawer configuration as desired. For example, a three-drawer configuration may be provided in one vertical space while a four-drawer configuration may be desirable in an adjacent vertical space (see FIG. 7).

Referring now to FIG. 2, each vertical member 19 comprises face 20 and two side flanges 21 which define an open channel 22. Each vertical member 19 also includes at least one slot opening 23 positioned in each side of side flanges 21. The channel-shape of vertical members 9 provides the vertical members with an U-shaped cross-section. Each horizontal interconnecting member 30 has a surface 60 adapted to engage and be connected with slot openings 23.

Each U-shaped structure 15 can further include a central member 18 positioned parallel to base member 26. Central member 18 is connected at one end to one of the channel-shaped vertical members 19 and is connected at its other end to the other of the channel-shaped vertical members 19. Central member 18 is preferably positioned a sufficient distance below opened end 17 of structure 15 to provide sufficient vertical clearance so as to permit the placement of a sink (not shown) in a counter surface at any point along the length of the frame. Central member 18 may be connected to vertical member 19 by any one of a variety of conventional means.

Structures 15 further includes means 40 for leveling structural frame 10 upon a selected surface. Leveling means 40 is more clearly shown in FIG. 3 wherein each of horizontal base members 26 of U-shaped structure 15 have threaded bores 42 formed therein and support legs 45 each having base 46 and threaded stem 47 attached to base 46. Support legs 45 are threaded into threaded bores 42 and are adjustable by the extent to which the support legs are threaded into the threaded bores to level structural frame 10. Preferably, base members 26 have a lower middle portion 27 which have two threaded bores 42 formed therein with the bores 42 positioned at opposing ends of middle lower portion 27. Lower middle portion 27 provides vertical portions 28 at each of its ends.

As shown most clearly in FIG. 2, bottom wall 50 comprises a horizontal platform 51 provided with engaging and interconnecting surfaces 55 which include parallel guide notches 56 positioned along the periphery of platform 51. Guide notches 56 extend inwardly from the periphery of platform 51 to receive side flanges 21 of vertical members 19 of U-shaped structures 15, thereby engaging vertical members 19 of U-shaped structures 15 and, in cooperation with base members 26, fastening the bottom ends of the plurality of U-shaped structures in structural frame 10. Platform 51 may further be provided with a plurality of holes 51a positioned near interconnecting surfaces 55 and in alignment with a plurality of holes 26a formed in base members 26. Conventional fastening means may then be inserted through the plurality of holes 51a and the plurality of holes 26a to affix platform 51 to structures 15.

Figure 3:
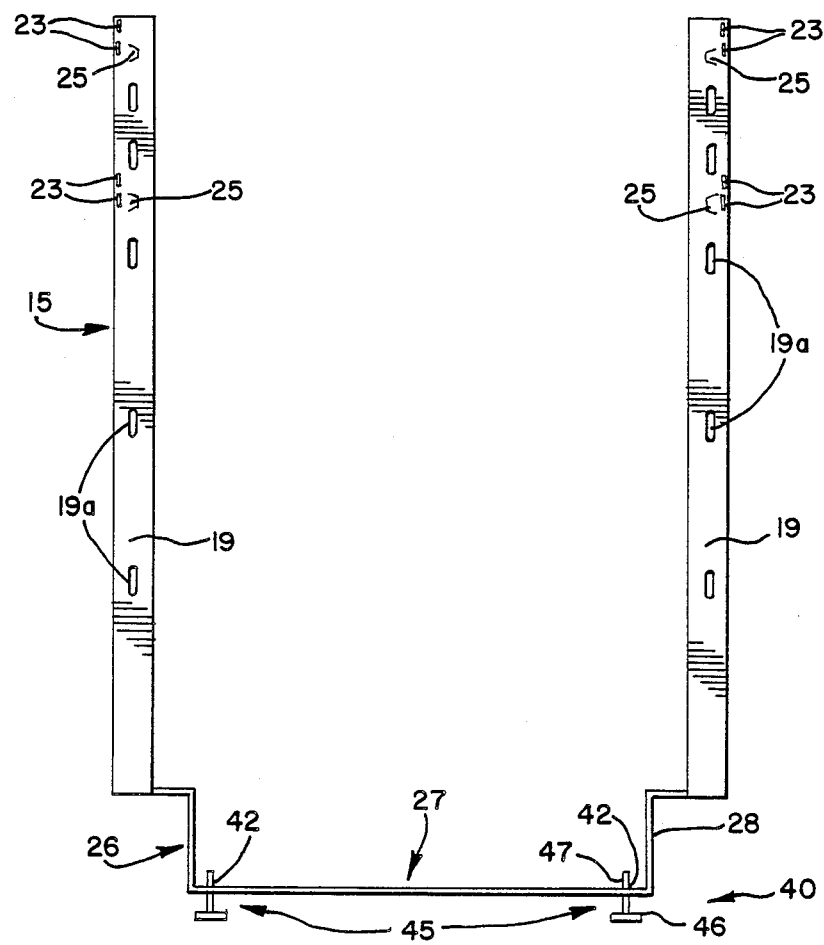
FIG. 3 is a plan view of a structure component of the invention.
Figure 4:
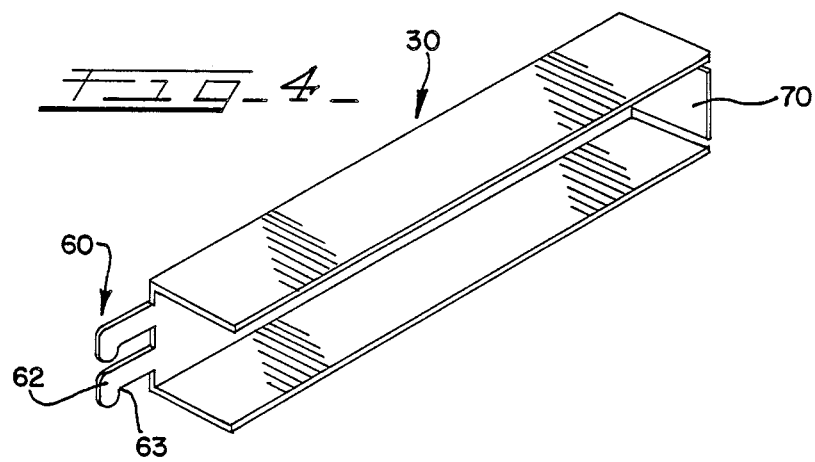
FIG. 4 is a perspective view of an end interconnecting member of the invention.

As shown in FIGS. 2, 4 and 6, each horizontal interconnecting member 30 is provided with slidable coupling means 60 positioned at at least one end of interconnecting member 30 and adapted to engage channel-shaped vertical members 19 for interconnecting horizontal members 30 with vertical members 19. Slidable coupling means 60 includes at least one hook-like member 62 having an inclined interior gripping surface 63 extending from horizontal interconnecting member 30. Each channel-shaped vertical member 19 is provided with at least one slot opening 23 positioned in side flanges 21 (FIG. 3). In assembly of a structural frame of this invention, hook-like member 62 extending from horizontal interconnecting member 30 can be inserted into slot opening 23 and moved downwardly so that inclined interior gripping surface 63 of hook-like member 62 engages vertical member 19, thereby rigidly coupling horizontal interconnecting member 30 to vertical member 19. In preferred embodiments as shown in the FIGS., each horizontal interconnecting member includes two hook-like members 62 extending outwardly from its end, or ends, to engage two slots 23 (FIG. 3) formed in the side flanges 21 of vertical members 19. As further shown in FIG. 4, interconnecting members 30 for use at the ends of structural frame 10 may include leg bracket 70 positioned at one end of horizontal interconnecting member 30. Leg bracket 70 extends transversely inwardly from the face of horizontal interconnecting member 30, thereby providing a surface to which vertical end panels may be affixed. The fastening surface provided by leg bracket 70 may be provided with pre-formed fastening holes 70a if desired.

Each vertical member 19 further includes at least one fastening portion to prevent the movement of hook-like member 62 from slot opening 23. Such a fastening portion comprises bendable ear 25 formed in vertical members 19 adjacent slot openings 23. Bendable ear 25 is formed with an inclined horizontal edge 25a and is bendable between a first position wherein the ear is flush with side flanges 21 of vertical member 19 to a second position, as shown in FIGS. 4, 5 and 6, wherein ear 25 extends outwardly away from side flange 21 to engage horizontal interconnecting member 30. Inclined horizontal edge 25a of bendable ear 25 acts to increase the engagement b the ear and horizontal interconnecting member 30 by increasing engaging lower flange 30a of interconnecting member 30 as the ear is increasingly bent toward the second position away from side flange 21. Horizontal connecting member 30 is preferably provided with aperture 32 (FIG. 5) in the upper flange of the member to provide fastening holes for affixing a counter surface or the like atop the structural frame. To permit access to aperture 32, orifice 34 is provided in the lower flange of the member to allow a tool to be inserted therethrough.

A front view of the engagement and connection between vertical member 19 and interconnecting member 30 is shown in FIG. 6 wherein hook-like members 62 are inserted into slots 23 formed in vertical member 19 and bendable ear 25 is bent outwardly away from side flanges 21 of vertical member 19, whereby horizontal edge 25a of bendable ear 25 is in engagement with horizontal interconnecting member 30.

A presently preferred embodiment of the invention also provides a method of constructing a variable length structural frame 10 from U-shaped structures 15, interconnecting members 30 and bottom wall 50. In the method of the invention, the plurality of horizontal interconnecting members 30 may be connected to a plurality of U-shaped structures 15 to create structural frame 10 having a desired length and an opened center. Wall 50 may be assembled into the structural frame by tilting it about its longitudinal axis and inserting it through the opened center formed by the assembly of the plurality of the U-shaped structures, positioning the wall so that the plurality of surface portions 55 at the periphery of the wall engage the open channels 22 of the plurality of structures 15, and rotating the wall about its longitudinal axis until the plurality of surface portions 55 formed in the periphery of the wall engage channels 22 of the plurality of structures 15 and the wall is substantially perpendicular to the plurality of structures 15. Wall 50 may then be moved downwardly until it is adjacent the ends of the plurality of structures 15. The above sequence of assembly, however, is not critical to the method provided by this invention. For example, wall 50 may be first assembled with the U-shaped structures, with its surface portions 55 engagably affixed thereto prior to the interconnecting members being connected to the U-shaped structures.

As shown above, the invention provides means for building cabinet enclosures of variable length with three basic elements, a structure 15 comprising a pair of substantially parallel channels and a cross member interconnecting the channels and maintaining their spacing, an interconnecting member 30, and a wall. These three elements are adapted to be interconnected as described above into a structural frame for such cabinets. In some instances, it is desirable to provide a fourth element such as that shown in FIG. 4.

A completed counter base 80 is shown in FIG. 7 incorporating structural frame 10 (not shown) and the method provided by the invention. Counter base 80 may include counter surface 82 positioned horizontally atop structural frame 10 and affixed thereto by conventional means, such as mechanical fastening means utilizing apertures 32 and orifices 34 (FIG. 5), sink 84 positioned within counter surface 82, a plurality of vertical panels 86 affixed to structural frame 10, a plurality of drawers 88 supported within structural frame 10, and a plurality of hinged doors 90 affixed to structural frame 10. The sink 84 may be positioned and secured within the counter surface 82 by conventional means well known in the art. The vertical panels 86, as discussed above, may also be attached to the structural frame 10 by conventional means well known in the art. Counter base 80 may further include toe panel 92 which is attachable to vertical portions 28 of the plurality of base members 26. Toe panel 92 may be magnetically or mechanically attachable to vertical portions 28 and, being removable, allows a person access to the area below wall 50 of the structural frame to permit leveling of the cabinet and to permit cleaning or storage thereunder.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A structural frame comprising:

a plurality of adjacent U-shaped structures, each of said plurality of U-shaped structures having an opened end, two channel-shaped vertical members, and a closed bottom end defined by a horizontal base member connecting said vertical members together and extending therebetween;

a plurality of horizontal interconnecting members; and a bottom wall, each of said plurality of U-shaped structures being interconnected near its opened end to the adjacent U-shaped structure by said horizontal interconnecting members extending from the channel-shaped vertical members of each of said U-shaped structure to the channel-shaped vertical members of the adjacent U-shaped structures, each of said plurality of U-shaped structures being positioned so that said horizontal base members form a base for the structural frame, said bottom wall being adapted to provide surfaces engaging and interconnecting said vertical members of said U-shaped structures adjacent said base members, each of said channel-shaped vertical members having two side surfaces and a face extending therebetween and including at least one fastening portion to rigidly secure the vertical member to the interconnecting member, said fastening portion comprising a bendable ear or tab formed in one of said side surfaces of said vertical member adjacent the point of connection between the vertical member and the interconnecting member, said ear or tab having an inclined horizontal edge and being bendable from a first position wherein said ear or tab is flush with the side surface of said vertical member to a second position wherein said ear or tab extends outwardly away from the side surface of said vertical member to firmly engage said horizontal interconnecting member, the inclined horizontal edge of said bendable ear or tab acting to increase the engagement between the vertical member and the horizontal interconnecting member as the ear or tab is bent toward the second position by a camming action produced by the inclined horizontal edge of the ear or tab against the interconnecting member.

2. The structural frame as in claim 1 wherein each said vertical member of said U-shaped structures further comprises at least one slot opening positioned in each of said two side surfaces, and each of said plurality of horizontal interconnecting members has a surface at at least one end adapted to engage and be connected with the at least one slot opening.

3. The structural frame as in claim 1 wherein each said vertical member of said U-shaped structures has a plurality of holes formed therein.

4. The structural frame as in claim 1 wherein each of said plurality of U-shaped structures further includes a central cross member positioned parallel to said base member, said central cross member being connected at one end to one of the channel-shaped vertical members and being connected at the other end to the other of the channel-shaped vertical members.

5. The structural frame as in claim 1 wherein said plurality of U-shaped structures further comprises means for leveling said frame upon a selected surface.

6. The structural frame as in claim 5 wherein said leveling means comprises:

at least two of said plurality of U-shaped structures having at least two threaded bores formed in each of their horizontal base members; and a plurality of support legs each having a base and a threaded stem attached to said base, said support legs being threaded into said threaded bores and being adjustable to level said structural frame by the extent to which said support legs are threaded into said bores.

7. The structural frame as in claim 1 wherein each said horizontal base member of said plurality of U-shaped structures has a lower middle portion and vertical portions at each end of said lower middle portion.

8. The structural frame as in claim 7 wherein said lower middle portion has at least two threaded bores formed therein, one of said bores being positioned adjacent one end of the lower middle portion and the other bore being positioned adjacent the opposite end of the lower middle portion.

9. The structural frame as in claim 8 further comprising at least four support legs, each having a base and a threaded stem attached to said base, said support legs being threadable into said bores in the lower middle portions of said horizontal base members and being adjustable to level said structural frame by the extent to which said support legs are threaded into said bores.

10. The structural frame as in claim 2 wherein said bottom wall comprises a horizontal platform having parallel guide notches positioned along its periphery, said guide notches extending generally transversely inwardly from the periphery of said platform and being adapted to receive the side flanges of said vertical members, thereby engaging said vertical members of U-shaped structures and, in cooperation with said horizontal base members, securing the bottom end of said plurality of U-shaped structures in the structural frame.

11. The structural frame as in claim 1 wherein each of said plurality of horizontal interconnecting members has a slidable coupling means positioned at each end of said horizontal interconnecting member and adapted to engage the channel-shaped vertical members for coupling said horizontal interconnecting member with said vertical members.

12. The structural frame as in claim 11 whererin each of said channel-shaped vertical members are provided with a slot opening, said slidable coupling means comprises at least one hook-like member having an inclined interior gripping surface extending from said horizontal interconnecting member, said hook-like member being insertable into the slot opening in said vertical member and downwardly movable, whereby said inclined interior gripping surface of said hok-like member engages said vertical member, rigidly coupling said horizontal interconnecting member to said vertical member.

13. The structural frame as in claim 7 further comprising a toe panel removably attached to the vertical portions of the base members.

14. Means for building cabinet enclosures of variable length, comprising:

a plurality of structures having an upper end and a lower end and comprising a pair of substantially parallel vertical members and a cross member interconnecting the pair of vertical members and maintaining their spacing adjacent the lower end, each of said vertical members having a channel formed therein defined by two side flanges and a face extending therebetween, a plurality of interconnecting members having ends; and a wall, said vertical members and said interconnecting members being adapted to be interconnected to the side flanges of the vertical members adjacent the upper end of the structure, said wall being adapted to provide surfaces engaging and interconnecting the channels of the vertical members adjacent the lower end of each of the plurality of structures, whereby the plurality of structures may be supported vertically and form a cabinet framework of variable length, the side flanges of the vertical members being provided with locking means formed as an integral part thereof, said locking means defined by a tab adapted to be bent into engagement with the interconnecting members when the interconnecting members engage the vertical members to firmly secure said engagement, said vertical members having a U-shaped cross section and the wall having a plurality of slots in the periphery thereof, said slots being arranged in a plurality of pairs to permit the side flanges of the vertical members of the plurality of structures to be received therein, the pairs of slots being spaced along the periphery of the wall at intervals of distance approximately equal to the length of the interconnecting members.

15. The means of claim 14 wherein the side flanges of the vertical members each includes a slot-engaging surface.

16. The means of claim 15 wherein the slots are formed as openings in the side flanges of the vertical members and the slot-engaging surfaces of the interconnecting members are hook-like extensions of the interconnecting members.

17. The means of claim 14 wherein the channels of the plurality of structures each have a plurality of holes formed therein.

18. The means of claim 14 wherein each of the plurality of structures further includes a cross member adjacent the upper end.

* * * * *

UNITED STATES PATENT AND TRADEMARK OFFICE
CERTIFICATE OF CORRECTION

PATENT NO. : 4,973,110

DATED : November 27, 1990

INVENTOR(S) : Lawrence M. Nyquist

It is certified that error appears in the above-identified patent and that said Letters Patent is hereby corrected as shown below:

In col. 1, line 20, after "portions", insert --.-- (period).

In col. 3, line 32, after "FIG. 2", insert --is--.

In col. 4, line 21, delete "9", and insert therefor --19--.

In col. 5, line 48, delete "b", and insert therefor --between--.

In col. 8, line 44, delete "whererin", and insert therefore --wherein--; line 52, delete "hok-like", and insert therefor --hook-like--.

Signed and Sealed this

Thirty-first Day of March, 1992

Attest:

HARRY F. MANBECK, JR.

*Attesting Officer*  *Commissioner of Patents and Trademarks*